United States Patent Office 2,988,489
Patented June 13, 1961

2,988,489
METHOD OF PRODUCING L-ORNITHINE BY FERMENTATION
Shukuo Kinoshita, Kiyoshi Nakayama, Shigezo Udaka, and Sohei Kitada, all of Tokyo, Japan, assignors to Kyowa Hakko Kogyo Kabushiki Kaisha, Tokyo, Japan, a corporation of Japan
No Drawing. Filed Aug. 26, 1958, Ser. No. 757,209
Claims priority, application Japan Sept. 19, 1957
6 Claims. (Cl. 195—47)

This invention relates to the direct production and accumulation of L-ornithine in large quantities in a culture medium which contains saccharine materials, nitrogen sources and inorganic substances, by culturing a microorganism therein.

L-ornthine is well known as an important metabolic compound in the living cells. This compound has been proved indispensable as a biochemical for the investigation of the metabolism of the living materials, especially in connection with so called "ornithine cycle." Since the chemically prepared ornithine is optically inactive, L-ornithine prepared by fermentation is especially useful for the study of biological systems.

Although L-ornithine could be prepared from L-arginine by the action of an enzyme, arginase, the method requires fairly expensive L-arginine, and therefore applicable for only experimental preparation.

We found that a certain strain of microorganism which belongs to the genus Micrococcus which can produce and accumulate L-ornithine in large quantities in a culture medium. The strain is designated as ATCC No. 13232, this strain is a mutant strain, which requires citrulline or arginine, but not ornithine, for growth, which was obtained by ultraviolet irradiation of the parent strain of *Micrococcus glutamicus* ATCC No. 13032, applying the method of Davis (Journal of American Chemical Society, 70, 4267, 1948). *Micrococcus glutamicus* is a species which is not found in Bergey's Manual of Determinative Bacteriology (7th edition), because *Micrococcus glutamicus* is a new species discovered in 1955 by Shukuo Kinoshita, one of the present inventors, and his co-workers. The characteristics of *Micrococcus glutamicus* were described in the paper entitled "Taxonomical Study of Glutamic Acid Accumulating Bacteria, *Micrococcus glutamicus* nov. sp." (see Bulletin of the Agricultural Chemical Society of Japan, vol. 22, No. 3, pp. 176 to 185, 1958). As is pointed out in "Taxonomical Study of Glutamic Acid Accumulating Bacteria, *Micrococcus glutamicus* nov. sp.," the classification of *Micrococcus glutamicus* may be dependent upon the conditions under which the culture is grown, the criteria considered dominant in establishing the genus, and the classification scheme accepted by the taxonomist. Other investigators may classify the same organism as either a Micrococcus, a Corynebacterium or a Bacterium. In view of the new classification in Bergey's Manual of Determinative Bacteriology (7th edition), the organism may also be classified as Brevibacterium, instead of Bacterium.

It has now been found that said strain is useful in that it has the ability of accumulating L-ornithine substantially exclusively among other amino acids. The existence of such a strain as would substantially exclusively accumulate L-ornithine in large quantities has not hitherto been known. Now the discovery of this strain makes it possible to produce easily the optically active L-ornithine by fermentation.

The microorganisms are grown on nutrient media under aerobic conditions. Various types of media can be usable which contain the required amount of arginine, or citrulline. Media containing such as peptone, NZ-amine (trade name for an enzymatic digest of casein for microbiological use), meat extract, corn steep liquor, casein hydrolyzate, soybean hydrolyzate, fish meal and the like, are also effective for the growth of microorganism because these contain the required amino acids. As for the carbon sources to be used in the culture medium, carbohydrate such as glucose, sucrose, fructose, maltose, molasses and the like may be used; as for the nitrogen sources, together with aforementioned organic nitrogen sources, such as ammonia, urea, ammonium sulfate, ammonium chloride, ammonium nitrate, and the like may be used; as for the inorganic salts, potassium phosphate, magnesium sulfate, ferrous chloride, sodium chloride and the like may be used.

The microorganisms may be maintained on glucose-bouillon agar slants which is commonly known to every microbiologist. The cells grown on the agar slants are used for the inoculum for shake flask culture. The shake culture is operated at a temperature of from about 25° C. to about 35° C. for a period of from one to five days. In general, it is preferred to maintain the pH of the culture medium at a state of neutrality (between about 6 to 8) to attain high yield of L-ornithine by addition of neutralizing agent such as ammonium hydroxide and alkali. Urea may also preferably be used for this purpose, as it is converted to ammonia. The process may be operated in glass bottle fermentor or, in large scale fermentor suitably equipped with agitating and aeration devices and so constructed that the vessels may be sterilized before the fermentation is commenced. Aeration is generally conducted at a rate of about equal volume of air to volume of medium per minute.

The progress of the fermentation may be followed most readily by taking samples from the fermenting liquor at periodic intervals and analyzed by Chinard colorimetric analysis as described in Journal of Biological Chemistry, 199, 91 (1952). The enzymatic quantitative anlysis utilizing the cells of *Clostridium septicum* as described by Gale in Biochemical Journal, 41, vii (1947), is also available as a good analytical method. The amount of carbohydrate left in the fermentation medium may also indicate the progress of the fermentation, since L-ornithine is usually produced in parallel with the consumption of carbohydrate. Under the appropriate condition as described above, approximately 25 to 30 percent by weight of L-ornithine for consumed carbohydrate is generally obtained.

Various procedures may be used for isolation of the L-ornithine during the process of the present invention. One method which has been found useful is to filter the fermentation broth and pass the broth through a column of a strong acidic cation exchange resin to absorb L-ornithine. The column was washed with salt free water, then the L-ornithine absorbed is eluted with 2 N hydrochloric acid. The pH of the eluate is adjusted with sodium hydroxide to approximately 6. The neutral eluate is thereupon concentrated to a small volume, until the concentration of L-ornithine reaches about 400 grams per liter. Two times volume of 95% ethyl alcohol is added to the concentrated solution and is left cool at 0° C. Crystalline L-ornithine monohydrochloride separates from the solution. This product may be filtered and dried.

The following examples are given by way of illustration and are not intended as a limitation on the scope of this invention. In fact, as many widely varying embodiments are possible without departing from the spirit and scope of the herein described invention, it is to be understood that this invention is only limited by the specific wording of the appended claims.

*Example 1*

A mutant strain of *Micrococcus glutamicus* No. 601

(ATCC No. 13232) which requires citrulline or arginine, but not ornithine, was obtained as follows: two ml. of the cell suspension of *Micrococcus glutamicus* ATCC No. 13032 was placed in the ordinary laboratory Petri dish and irradiated by 15 watt of ultraviolet lamp from the distance of 50 cm. for 4 minutes. These ultraviolet treated cells were subjected to the isolation of mutant according to the method of Davis. The said mutant is cultured in shake flask for 16 hours in a bouillon medium containing 2 percent glucose and cells grown in the medium were utilized as the inoculum.

The fermentation medium was as follows:

| | Grams per liter |
|---|---|
| Glucose | 100 |
| $K_2HPO_4$ | 1 |
| $MgSO_4 \cdot 7H_2O$ | 0.25 |
| $NH_4Cl$ | 10 |
| Urea | 3 |
| Corn steep liquor | 5 |
| NZ-amine | 10 |
| Water | The balance | pH was adjusted to about 7 with sodium hydroxide.

Five percent by volume of inoculum broth was added to the above sterilized medium and the fermentation was conducted with shaking at 28° C. for 3 days. The pH of the culture medium was measured from time to time and a small amount of 5.0 percent urea solution, which was sterilized separately, was added to the medium to maintain the pH of the culture medium at a state of neutrality. The production of L-ornithine in the fermentation broth was as follows:

| | 1st day | 2nd day | 3rd day |
|---|---|---|---|
| Residual glucose (percent by weight) | 5.48 | 1.77 | 0.54 |
| L-ornithine produced (grams per liter) | 10.0 | 24.0 | 26.2 |

After completion of the fermentation, the broth was centrifuged and the cells were removed. Then L-ornithine in the filtered broth was absorbed in cation exchange resin, Amberlite IR-120, and then eluted with 2 N HCl. One liter of the eluate was neutralized and concentrated in vacuo to 30 ml. The concentrate was treated once with 1 gram of active carbon and was adjusted to pH 6 with 10% sodium hydroxide aqueous solution, then 60 ml. of 95% ethyl alcohol was added to the solution. After the solution was left cool at 0° C. overnight, the crystal was filtered out and dried, then 18 grams of crude crystal of L-ornithine monohydrochloride was thus obtained. Ten grams of this crystal was dissolved in 40 ml. of water and treated with 0.5 gram of active carbon, then L-ornithine monohydrochloride was recrystallized by adding 100 ml. of 95% ethyl alcohol. This crystallization procedure was repeated again to give a pure product, of which the main physicochemical properties are as follows:

| | Found values | Literature values |
|---|---|---|
| Melting point (° C.) | 232–233 | 230. |
| Specific rotatory power $[\alpha]_d$ | +10.9 (C=5.5, $H_2O$). | +11.0 (C=5.5, $H_2O$). |

*Elementary analysis.*—Calculated for $C_5H_{13}O_2N_2Cl$: C=35.56, H=7.77, N=16.60. Found: C=35.49, H=7.40, N=16.67.

*Example 2*

The process described in Example 1 was repeated utilizing the same microorganism, and 130 grams of cane molasses (equivalent to 78 grams of sugar) in place of glucose.

After 3 days' culture, the culture medium was found to contain 22.4 grams of L-ornithine per liter. The L-ornithine produced in the medium was isolated and purified. Approximately 15 grams of L-ornithine monohydrochloride was obtained as pure crystal per liter of medium.

*Example 3*

The process described in Example 1 was repeated utilizing the same microorganism and a medium which was made up with the following composition:

| | Grams per liter |
|---|---|
| Sucrose | 50 |
| Ammonium sulfate | 20 |
| Peptone | 5 |
| Meat extract | 5 |
| Urea | 3 |
| $KH_2PO_4$ | 0.5 |
| $K_2HPO_4$ | 0.5 |
| $MgSO_4 \cdot 7H_2O$ | 0.3 |
| $FeSO \cdot 7H_2O$ | 0.01 |
| Water | The balance | pH was adjusted to 7.2 with sodium hydroxide.

After 3 days' culture, the culture medium was found to contain 16.9 grams of L-ornithine per liter.

*Example 4*

The process described in Example 1 was repeated utilizing the same microorganism and the same medium except that 10% aqueous ammonia was used in place of urea for adjustment of the pH of the fermenting liquor.

After 3 days' culture, the culture medium was found to contain 31.0 grams of L-ornithine per liter.

We claim:

1. A method of producing L-ornithine by fermentation which comprises culturing a mutant of *Micrococcus glutamicus* which requires a member selected from the group consisting of citrulline and arginine, but not ornithine, for its growth in a culture medium containing carbohydrate, nitrogen sources and inorganic salts under aerobic conditions, while maintaining the pH of the medium near neutrality, accumulating L-ornithine in said medium and recovering said L-ornithine.

2. A method according to claim 1, wherein the microorganism employed is *Micrococcus glutamicus* No. 601 which corresponds to the microorganism designated ATCC No. 13232.

3. A method according to claim 1, wherein the nitrogen sources of the culture medium comprises at least one of nitrogen sources selected from the group consisting of corn steep liquor, enzymatic digest of casein for microbiological use, peptone and meat extract.

4. A method according to claim 1, wherein the carbohydrate is cane molasses.

5. A method of producing L-ornithine by fermentation which comprises (a) aerobically culturing a mutant of *Micrococcus glutamicus* in a culture medium containing carbohydrate, nitrogen source and inorganic salt while maintaining the pH of the medium near neutrality, said mutant requiring citrulline, but not ornithine, for its growth, (b) accumulating L-ornithine in said medium and (c) recovering said L-ornithine.

6. A method of producing L-ornithine by fermentation which comprises (a) aerobically culturing a mutant of *Micrococcus glutamicus* in a culture medium containing carbohydrate, nitrogen source and inorganic salt while maintaining the pH of the medium near neutrality, said mutant requiring arginine, but not ornithine, for its growth, (b) accumulating L-ornithine in said medium and (c) recovering said L-ornithine.

References Cited in the file of this patent

FOREIGN PATENTS

| 216,245 | Australia | July 28, 1958 |
| 216,246 | Australia | July 28, 1958 |

(Other references on following page)

OTHER REFERENCES

"Advances in Enzymology," by Nord, Interscience Publishers, Inc., New York (1955), vol. 16, pp. 261–263 and 266 relied on.

"Annual Review of Microbiology," by Clifton et al., Annual Reviews, Inc., Palo Alto, Calif. (1956), vol. 10, p. 339.

"Annual Review of Biochemistry," by Luck et al., Annual Reviews, Inc., Palo Alto, Calif. (1958), vol. 27, p. 575.

UNITED STATES PATENT OFFICE
CERTIFICATE OF CORRECTION

Patent No. 2,988,489  
June 13, 1961

Shukuo Kinoshita et al.

It is hereby certified that error appears in the above numbered patent requiring correction and that the said Letters Patent should read as corrected below.

In the grant (only), line 1, for "Kiyoshi Nakayame" read -- Kiyoshi Nakayama --.

Signed and sealed this 3rd day of December 1963.

(SEAL)  
Attest:

ERNEST W. SWIDER  
Attesting Officer

EDWIN L. REYNOLDS  
Acting Commissioner of Patents